2,926,606
Patented Mar. 1, 1960

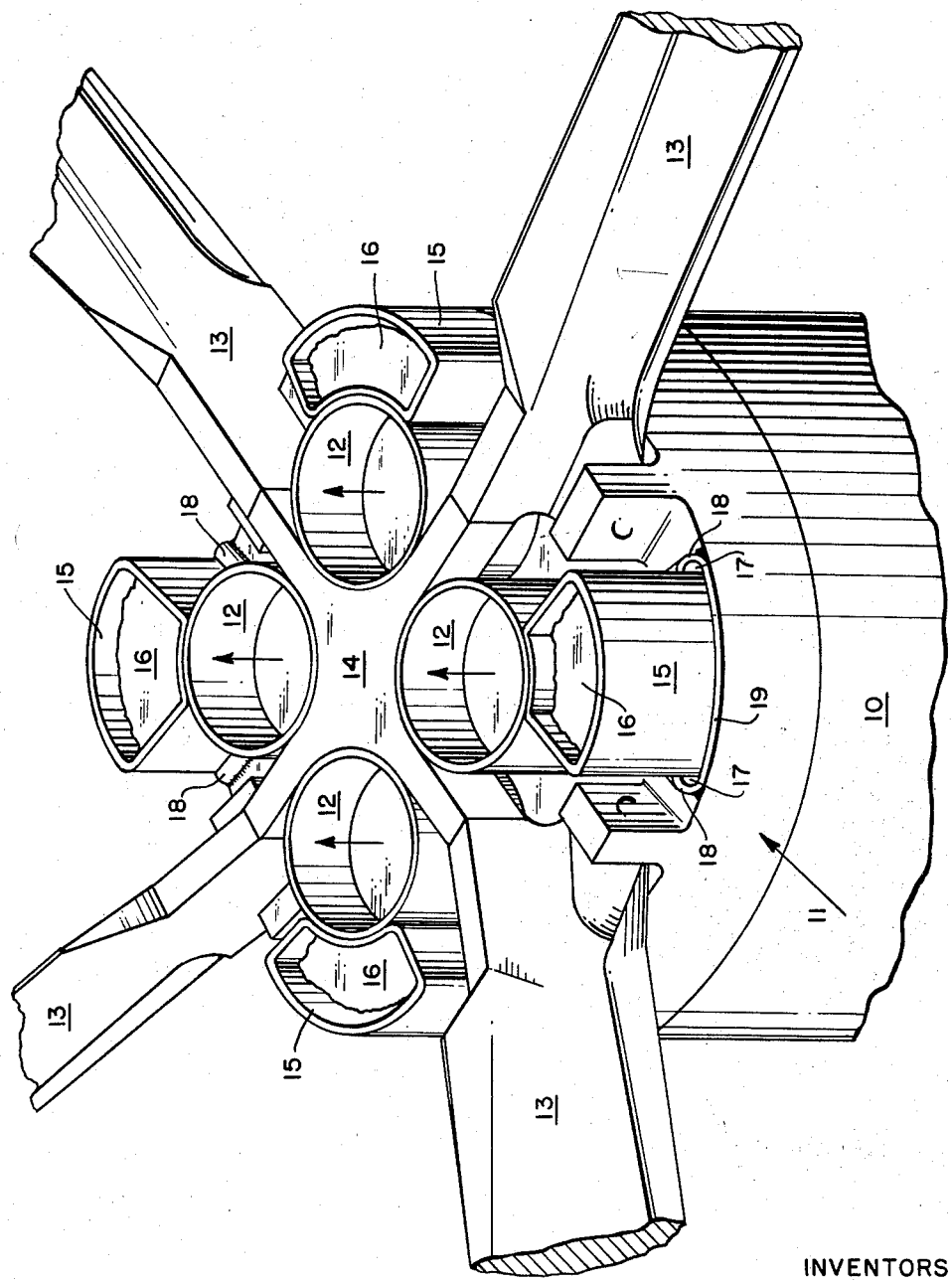

2,926,606

SECTOR TRACER

Gordon E. Bangs and Earl G. Loomis, China Lake, and Reginald Gregory, Altadena, Calif., assignors to the United States of America as represented by the Secretary of the Navy Application August 13, 1954, Serial No. 449,804

5 Claims. (Cl. 102—34.5)

(Granted under Title 35, U.S. Code (1952), sec. 266)

The invention described herein may be manufactured and used by or for the Government of the United States of America for governmental purposes without the payment of any royalties thereon or therefor.

The present invention relates to rockets and is more particularly directed to an improved tracer arrangement for rockets for facilitating visual and photographic tracking of the rocket during flight.

The tracer arrangement of this invention is intended primarily, although not exclusively, for use on a rocket of the type including, at its after end, a plurality of discharge or propulsion nozzles symmetrically disposed about the rocket axis and through which gases, generated by a burning propellant, are expelled for propelling the rocket through the air. A prior tracer arrangement for rockets of the type just described, comprised a cylindrical container, open at its after end, which was filled with a suitable chemical tracer mix. This tracer cylinder was mounted on the after end of the rocket centrally of the discharge nozzles. Such prior arrangement proved to be unsatisfactory, however, since the burning surface area which was obtainable was small and the illumination furnished was such as to render it difficult, if not impossible, to track a distant rocket after burn-out of the rocket propellant.

The present invention overcomes the disadvantages which are associated with such prior tracer arrangement by providing a plurality of sector-shaped tracer elements which are disposed about the rocket exhaust nozzles and ignited by the exhaust gases issuing therethrough, the construction being such as to provide an increased total burning surface area and therefore increased illumination whereby to insure remote rocket tracking.

In accordance with the foregoing, an object of the invention is the provision of an improved rocket tracer assembly for facilitating remote visual and photographic tracking of the rocket following rocket propellent burnout.

Another object of the invention is to provide an improved tracer assembly for rockets, as in the foregoing, comprising a plurality of sector-shaped tracer elements symmetrically disposed about the rocket axis at the after end thereof and adapted to be ignited by the rocket exhaust gases whereby to increase the reliability of functioning of the tracer elements.

Other objects and numerous of the advantages of the present invention will become apparent as the same becomes better understood from the following detailed description had in conjunction with the annexed drawing, wherein the single figure illustrates, in perspective, the tracer arrangement of the present invention.

Referring now to the drawing, 10 denotes the motor tube of a rocket having a nozzle plate 11 fixed to its after end. Nozzle plate 11 may include a plurality of axially extending discharge or propulsion nozzles 12, as shown, or a single nozzle, communicated with a combustion chamber (not shown) within the motor tube 10 and through which the propulsion gases, generated by a burning propellant grain (not shown) within the motor tube, are discharged at a high velocity for propelling the rocket in flight. The rocket on which the present tracer arrangement is primarily intended to be used, includes a plurality of guide fins 13 which are pivotally mounted on the nozzle plate 11 for swinging movement from a retracted position, wherein the rocket may move through a launching tube, to the extended position illustrated, the fins being cammed to such extended position by a gas-pressure actuated, axially movable camming element 14. Since the fins and the camming element form no part of the present invention a more detailed description thereof is deemed unnecessary.

The tracer arrangement of the invention comprises a plurality of sector-shaped cups 15 which are open at their after ends, as shown, and filled with a suitable solid chemical tracer mix 16. Each of the cups 15 is provided at its bottom with a pair of laterally extending flanges 17, which flanges are received in a pair of channels 18 formed at opposite ends of a sector plate 19 associated with each of the cups 15. The width of the channels 18 and thickness of the flanges 17 are such that the flanges are frictionally held in the channels. Sector plates 19 are secured to the nozzle plate 11 in any suitable manner. Each tracer cup 15 is mounted adjacent a discharge nozzle 12, with the inner arcuate surfaces of the cups abutting the outer cylindrical surfaces of their respective nozzles and the after ends of the cups lying substantially in the plane of the after ends of the nozzles 12.

In operation, the propellent gases issuing through discharge nozzles 12 during flight effect ignition of the tracer mixes 16, the latter each being of a quantity sufficient to provide a burning time substantially in excess of the rocket propellent burning time whereby to enable the rocket to be followed, either visually or by photographic apparatus, after rocket propellent burnout.

In the aforementioned prior traced arrangement, the tracer mix was disposed in a cylindrical container fixed to the cam element 14. As previously stated, such prior arrangement failed to provide sufficient burning surface area to insure reliable ignition and enable remote tracking of the rocket after burnout. The present arrangement provides substantially increased total burning surface area whereby to insure ignition and provide the additional illumination necessary to such remote tracking.

Obviously, many modifications of the present invention are possible in the light of the above teachings. It is therefore to be understood that within the scope of the appended claims, the invention may be practiced otherwise than as specifically described herein.

What is claimed is:

1. In a rocket of the type including discharge nozzle means at the after end thereof, the improvement comprising a plurality of cup members fixed to the after end of said rocket adjacent said nozzle means and symmetrically disposed about the axis of the rocket, each of said cup members having an open after end disposed substantially in the plane of the end of the said nozzle means, and a combustible material filling each of said cups and adapted to be ignited by the rocket exhaust gases whereby to provide a source of illumination.

2. In a rocket of the type including a plurality of discharge nozzles at the after end thereof, a plurality of sector-shaped cup members equal in number to the number of nozzles, fixed to the after end of the rocket with one of said cup members adjacent each nozzle, each of said cups having an open after end disposed substantially in the plane of the end of its adjacent nozzle, and a combustible tracer mixture filling each of said cup members and adapted to be ignited by the exhaust gases issuing through its adjacent discharge nozzles, whereby to provide an improved source of illumination.

3. In a rocket of the type including a plurality of discharge nozzles at the after end thereof, the improvements comprising a plurality of cup members equal in number to the number of nozzles, each of said cup members being formed at its bottom with a pair of laterally extending flanges, a substantially sector-shaped plate fixed to the after end of the rocket adjacent each nozzle and having an inwardly opening channel formed at each end, one of said cup members being mounted on each sector plate with the cup flanges received and frictionally held in said channels, a chemical tracer mix filling each of said cups and adapted to be ignited by the exhaust gases issuing through the discharge nozzles for providing a relatively bright source of illumination.

4. A tracer rocket comprising a motor tube, a nozzle plate including a plurality of propulsion nozzles fixed to one end of said tube, a plurality of sector-shaped cups equal in number to the number of propulsion nozzles, each of said cups being open at one end and including a concave surface of substantially the same curvature as the external surface of said nozzles, a solid chemical tracer mix filling each cup and of a quantity to provide a burning time substantially in excess of the rocket propellent burning time, and means for securing said cups to the nozzle plate with one cup disposed adjacent to each nozzle and with the concave surface of each cup abutting the external surface of its respective nozzle, the open ends of the cups being disposed substantially in the plane of the discharge ends of the nozzles whereby the exhaust gases issuing through said nozzles will ignite the tracer mixes, the burning of the several tracer mixes providing sufficient illumination to permit accurate remote tracking of the rocket after rocket propellent burnout.

5. In a rocket of the type including discharge nozzle means at the after end thereof, cup means fixed to the after end of said rocket adjacent said nozzle means, said cup means being open at one end thereof, said open end being substantially in the plane of the end of said nozzle means, and a combustible material filling said cup means and adapted to be ignited by exhaust gases issuing from the adjacent nozzle means whereby to provide a source of illumination.

References Cited in the file of this patent

UNITED STATES PATENTS

| 694,032 | Semple | Feb. 25, 1902 |
| 2,530,934 | Barton et al. | Nov. 21, 1950 |

FOREIGN PATENTS

| 863,928 | France | Jan. 6, 1941 |